(12) United States Patent
Greenwood-Smith

(10) Patent No.: US 8,155,850 B2
(45) Date of Patent: Apr. 10, 2012

(54) SYSTEM FOR CONTROLLING PEAK TORQUE IN MANUAL TRANSMISSIONS

(75) Inventor: Andrew R Greenwood-Smith, Mount Martha (AU)

(73) Assignee: GM Global Technology Operations LLC, Detroit, MI (US)

( * ) Notice: Subject to any disclaimer, the term of this patent is extended or adjusted under 35 U.S.C. 154(b) by 445 days.

(21) Appl. No.: 12/508,264

(22) Filed: Jul. 23, 2009

(65) Prior Publication Data

US 2011/0022280 A1  Jan. 27, 2011

(51) Int. Cl.
G06F 7/00 (2006.01)

(52) U.S. Cl. .............. 701/68; 701/67; 701/33

(58) Field of Classification Search .......... 701/33, 701/36, 67, 68, 87; 60/591; 192/109 F
See application file for complete search history.

(56) References Cited

U.S. PATENT DOCUMENTS 3,805,521 A * 4/1974 Dafler et al. .......... 60/288
4,222,283 A   9/1980 Nagy
5,937,988 A * 8/1999 Otto et al. .......... 192/109 D
5,943,911 A   8/1999 Beckerman
6,250,201 B1  6/2001 Pagels et al.
6,319,173 B1 * 11/2001 Patel et al. .......... 477/180
6,546,727 B2 * 4/2003 Bockling et al. ........ 60/591

FOREIGN PATENT DOCUMENTS

DE  102005021975 A1  11/2006
DE  102009012573     9/2009

* cited by examiner

Primary Examiner — Gertrude Arthur Jeanglaude

(57) ABSTRACT

A system for controlling a flow of hydraulic fluid between a hydraulic actuator and a torque transmitting device includes a position sensor in communication with the hydraulic actuator and operable to detect a position of the hydraulic actuator, a temperature sensor in communication with the hydraulic fluid and operable to detect a temperature of the hydraulic fluid, and a flow control device. The flow control devices includes a housing defining a first passage and a second passage, the first passage in communication with the hydraulic actuator and the second passage in communication with the torque transmitting device. An electronic actuator is located between the first passage and the second passage and is operable to selectively control a flow of the hydraulic fluid between the first passage and the second passage. A controller is in communication with the position sensor, the temperature sensor, and the electronic actuator of the flow control device.

9 Claims, 2 Drawing Sheets

SYSTEM FOR CONTROLLING PEAK TORQUE IN MANUAL TRANSMISSIONS

FIELD

Figure 1:
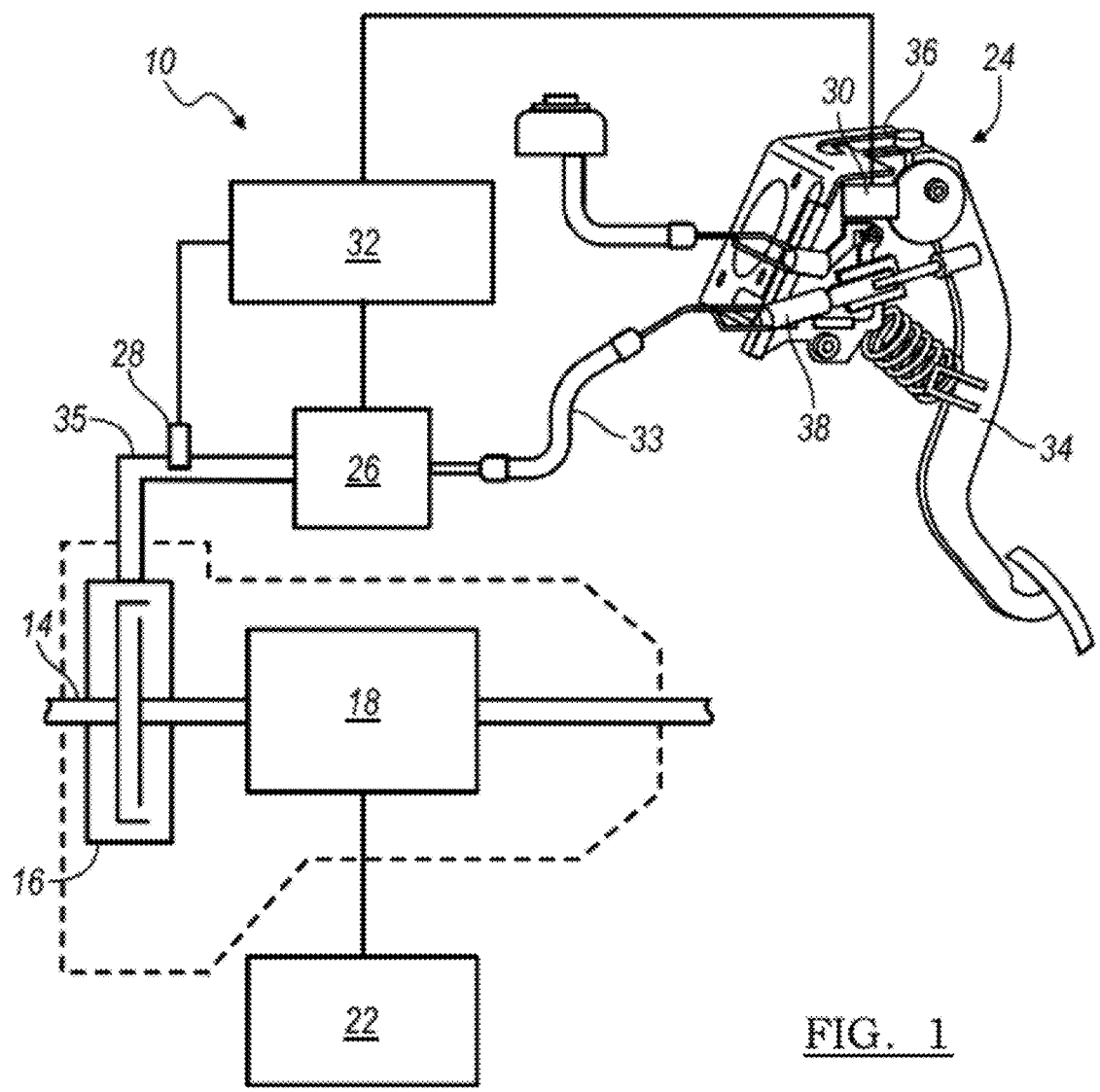

The invention relates generally to a system for controlling peak torque in a manual transmission, and more particularly to a system for controlling peak torque having an electronic actuator located between a clutch pedal and a clutch for controlling movement of hydraulic fluid to limit peak torque.

BACKGROUND

The statements in this section merely provide background information related to the present disclosure and may or may not constitute prior art.

A typical manual transmission includes a clutch pedal or clutch master cylinder with a clutch assembly or clutch slave cylinder. A hydraulic fluid communicates between the clutch pedal and the clutch assembly through a hydraulic line. Engagement of the clutch pedal by an operator of the motor vehicle sends the hydraulic fluid through the line to disengage the clutch. Release of the clutch pedal in turn releases the hydraulic fluid and the clutch re-engages. During normal operations, the clutch pedal is releases in a controlled manner and accordingly the flow of the hydraulic fluid away from the clutch assembly is controlled, and therefore the torque in the clutch is not too quickly engaged.

However, it is possible that the clutch pedal can be rapidly released. This in turn can result in a rapid reengagement of the clutch assembly, thereby leading to a peak amount of torque load on the transmission. This peak torque load increases the wear of the clutch assembly and can lead to the inclusion in the motor vehicle of heavier and more expensive driveline or powertrain components in order to sustain this peak torque. Accordingly, there is room in the art for a system for controlling the peak torque load in a manual transmission. The system should be efficient, should be adjustable based on the temperature of the hydraulic fluid, and should be inexpensive.

SUMMARY

The present invention provides a system for controlling a flow of hydraulic fluid between a hydraulic actuator and a torque transmitting device. The system includes a position sensor in communication with the hydraulic actuator and operable to detect a position of the hydraulic actuator, a temperature sensor in communication with the hydraulic fluid and operable to detect a temperature of the hydraulic fluid, and a flow control device. The flow control devices includes a housing defining a first passage and a second passage, the first passage in communication with the hydraulic actuator and the second passage in communication with the torque transmitting device. An electronic actuator is located between the first passage and the second passage. The electronic actuator is operable to selectively control a flow of the hydraulic fluid between the first passage and the second passage. A controller is in communication with the position sensor, the temperature sensor, and the electronic actuator of the flow control device. The controller includes memory for storing control logic, the control logic having a first control logic for receiving a data signal from the position sensor indicative of a position of the hydraulic actuator, a second control logic for determining a rate of hydraulic actuator movement, a third control logic for comparing the rate of hydraulic actuator movement to a threshold, a fourth control logic for receiving a data signal from the temperature sensor indicative of a temperature of the hydraulic fluid, and a fifth control logic for sending a control signal to the electronic actuator in order to open or close the electronic actuator based on the temperature of the hydraulic fluid and the comparison of the rate of hydraulic actuator movement to the threshold.

In one aspect of the present invention, the electronic actuator is a pulse-width modulated solenoid that is controlled by a pulse-width modulated input signal communicated from the controller.

In another aspect of the present invention, the housing of the flow control device defines a third passage that communicates between the first passage and the second passage.

In yet another aspect of the present invention, the flow control device further includes a one-way valve located within the third passage that permits flow of the hydraulic fluid from the third passage to the second passage.

In yet another aspect of the present invention, the rate of hydraulic actuator movement is the rate of hydraulic actuator movement from a fully engaged position to a fully released position.

In yet another aspect of the present invention, the threshold is based on the temperature of the hydraulic fluid sensed by the temperature sensor.

In yet another aspect of the present invention, the fifth control logic for sending a control signal to the electronic actuator in order to open or close the electronic actuator based on the temperature of the hydraulic fluid and the comparison of the rate of hydraulic actuator movement to the threshold occurs when the rate of hydraulic actuator movement exceeds the threshold.

Further objects, aspects and advantages of the present invention will become apparent by reference to the following description and appended drawings wherein like reference numbers refer to the same component, element or feature.

DRAWINGS

The drawings described herein are for illustration purposes only and are not intended to limit the scope of the present disclosure in any way.

Figure 2:
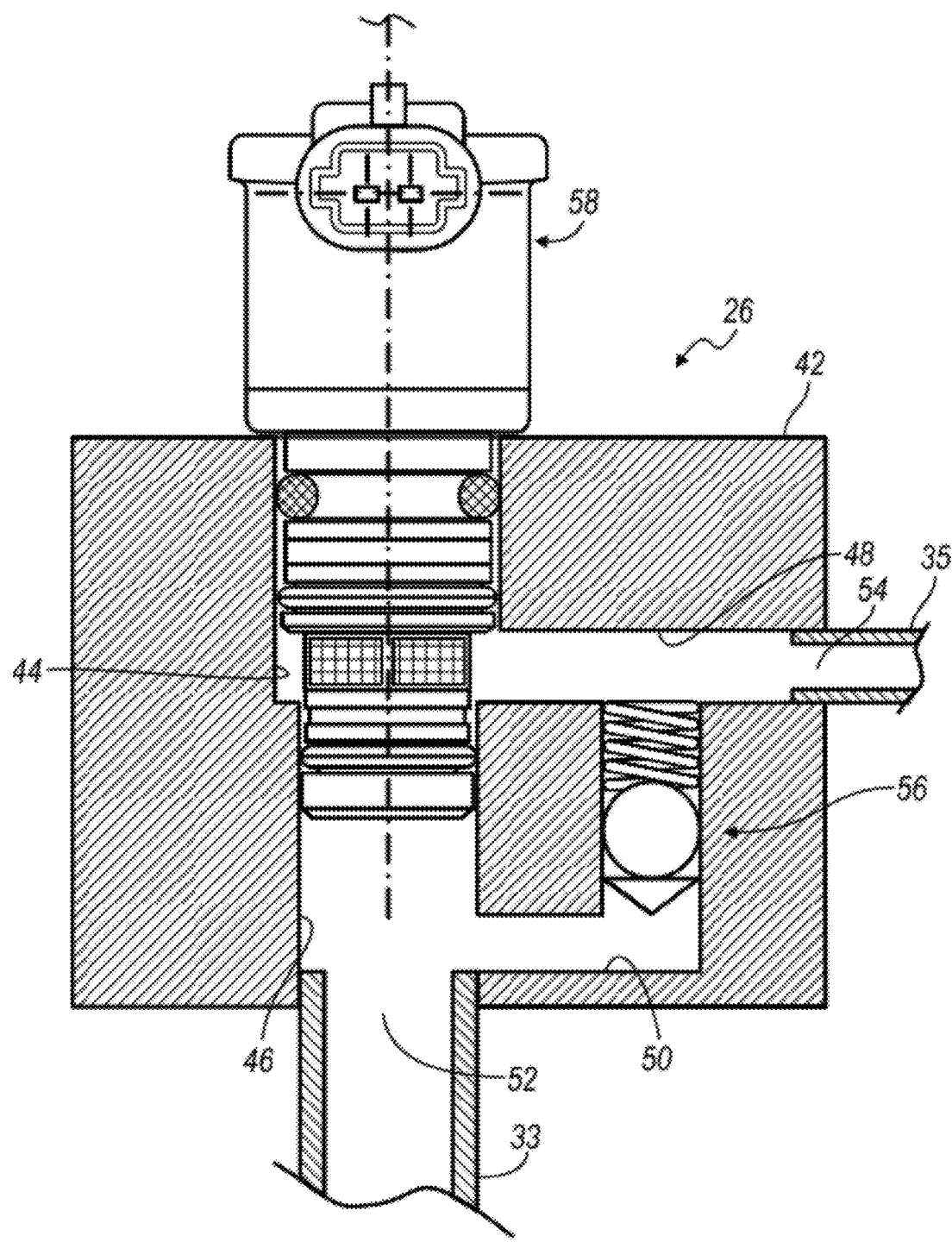

FIG. 1 is a schematic diagram of an embodiment of a control system in an exemplary manual transmission according to the principles of the present invention; and FIG. 2 is a schematic diagram of an embodiment of a device for controlling a flow of hydraulic fluid in the control system according to the principles of the present invention.

DETAILED DESCRIPTION

The following description is merely exemplary in nature and is not intended to limit the present disclosure, application, or uses.

With reference to FIG. 1, a clutch control system 10 according to the principles of the present invention is illustrated with an exemplary manual transmission 12 for a motor vehicle. The manual transmission 12 generally includes an input shaft 14, a clutch assembly 16, a plurality of gear sets 18, and an output shaft 20. The input shaft 14 is preferably coupled to an output of an engine (not shown). The clutch assembly 14 is a hydraulically actuated friction clutch that is operable to selectively couple the input shaft 14 to the plurality of gear sets 18. The clutch assembly 14 may take various forms and generally includes a set of interposed reaction discs or plates in a clutch pack. The plurality of gear sets 18 generally include a plurality of planar intermeshing gears (not specifically shown) that provide a plurality of forward gear ratios and at least one reverse gear ratio between the input shaft 14 and the output shaft 20. The plurality of gear sets 18 are selectively engageable to the output shaft 20 by a shift selector 22. The output shaft 20 is preferably coupled to a differential or final drive unit (not shown) of the motor vehicle.

The clutch control system 10 is operable to selectively control the engagement or disengagement of the clutch assembly 16 in order to allow selection of gears by the shift selector 22 during operation of the motor vehicle. The clutch control system 10 includes a hydraulic actuator assembly 24, a flow control device 26, a fluid temperature sensor 28, a pedal position sensor 30, and a controller 32. A first hydraulic line 33 connects the hydraulic actuator assembly 24 to the flow control device 26 and a second hydraulic line 35 connects the flow control device 26 to the clutch assembly 16 of the manual transmission 12.

The hydraulic actuator assembly 24 includes a pedal 34 pivotally mounted to a housing 36 and engageable by an operator of the motor vehicle. The pedal 34 is mechanically connected to a master hydraulic cylinder 38. A hydraulic fluid is located within the master hydraulic cylinder 38. The master hydraulic cylinder 38 is operable to move the hydraulic fluid and may include, for example, a translatable piston in contact with the hydraulic fluid within a cylinder, though various other configurations may be employed without departing from the scope of the present invention. The first hydraulic line 33 is connected at one end to the master hydraulic cylinder 38 and at an opposite end to the flow control device 26. The hydraulic line 33 allows the hydraulic fluid to communicate between the master hydraulic cylinder 38 and the flow control device 26 upon actuation of the pedal 34 and the master hydraulic cylinder 38, as will be described in greater detail below.

Turning to FIG. 2, the flow control device 26 is operable to selectively control a flow of the hydraulic fluid between the first hydraulic line 33 and the second hydraulic line 35. The flow control device 26 includes a housing or manifold 42 that defines a bore 44, a first fluid passage 46, a second fluid passage 48, and a third fluid passage 50. The first fluid passage 46 communicates between a first opening 52 in the housing 42 and the bore 44. The first hydraulic fluid line 33 is connected to the first opening 52. The second fluid passage 46 communicates between a second opening 54 in the housing 42 and the bore 44. The second hydraulic fluid line 35 is connected to the second opening 54. The third fluid passage 50 communicates between the first fluid passage 46 and the second fluid passage 48, thereby bypassing the bore 44. A valve 56 is located within the third fluid passage 50. The valve 56 is preferably a one way ball check valve, though various other types of valves may be employed without departing from the scope of the present invention.

The flow control device 26 further includes a solenoid 58 disposed within the bore 44. The solenoid 58 is positioned such that the solenoid 58 is located within the bore between the first fluid passage 46 and the second fluid passage 48. The solenoid 58 is preferably a pulse-width modulated (PWM) solenoid or variable force/bleed solenoid that is operable to allow selective communication between the first fluid passage 46 and the second fluid passage 48 upon receipt of an electrical frequency or signal. For example, the solenoid 58 is powered by using a controller generated pulse-width modulated input signal to rapidly open and close a switch in series with the solenoid 58 and a voltage source (for example, the battery of the motor vehicle). The average current through the solenoid 58 is indicative of the amount of solenoid movement, and therefore the amount of pressure and flow of the hydraulic fluid allowed through the solenoid 58.

Returning to FIG. 1, the fluid temperature sensor 28 is in communication with the hydraulic fluid and is operable to sense the temperature of the hydraulic fluid within the clutch control system 10. In the example provided, the fluid temperature sensor 28 is located within the second hydraulic line 35, however, it should be appreciated that the fluid temperature sensor 28 may be located anywhere so long as it is operable to sense a temperature of the hydraulic fluid. The fluid temperature sensor 28 may be of various types, such as digital or analog, without departing from the scope of the present invention.

The pedal position sensor 30 is preferably coupled to the housing 36 of the hydraulic actuator assembly 24 near the pivot point of the pedal 34. The pedal position sensor 30 is operable to detect the position of the pedal 34. The pedal position sensor 30 may be mounted elsewhere in the hydraulic actuator assembly 24 without departing from the scope of the present invention. In addition, the pedal position sensor 30 may be of various types without departing from the scope of the present invention. The pedal position sensor 30 may also be coupled to the master hydraulic cylinder 38 or to a linkage between the pedal 34 and the master hydraulic cylinder 38 and operable to detect the position of the pedal 34 based on the positions of the master hydraulic cylinder 38 and/or a linkage between the master hydraulic cylinder 38 and the pedal 34.

The controller 32 is, for example, a transmission control module, a vehicle or engine control module, or other electronic device having a preprogrammed digital computer or processor, control logic, memory used to store data, and at least one I/O peripheral. However, other types of controllers may be employed without departing from the scope of the present invention. The controller 32 is in communication with the solenoid 58 of the flow control device 26, with the fluid temperature sensor 28, and with the pedal position sensor 30. More specifically, the controller 32 is configured to receive data signals from the fluid temperature sensor 28 indicative of the temperature of the hydraulic fluid, to receive data signals from the pedal position sensor 30 indicative of the position of the pedal 34, and to send control signals to the solenoid 58 of the flow control device 26 in order to control the activation of the solenoid 58.

With combined reference to FIGS. 1 and 2, the operation of the clutch control system 10 will now be described in greater detail. When the pedal 34 is fully depressed, the clutch assembly 16 is fully disengaged, and no torque is transferred from the engine to the manual transmission 12 and by extension no torque is transferred to the drive wheels. In this uncoupled state it is possible to select gears using the shift selector 22 or to stop the motor vehicle without stopping the engine. More specifically, during normal operating conditions the solenoid 58 is commanded open and when the pedal 34 is depressed, the master hydraulic cylinder 38 forces the hydraulic fluid out through the first hydraulic line 33 and into the flow control device 26. The hydraulic fluid passes through the first fluid passage 46, through the open solenoid 58, and through the second fluid passage 48 and into the second hydraulic fluid line 35. If the pedal 34 is depressed hard enough, thereby generating sufficient pressure, the hydraulic fluid opens the valve 56 and hydraulic fluid is permitted to flow from the third fluid passage 50 into the second fluid passage 48. The hydraulic fluid then enters the clutch assembly 16 of the manual transmission 12 and contacts a piston (not shown) that in turn translates and disengages the clutch assembly.

When the pedal 34 is fully released, the clutch assembly 16 is fully engaged thereby providing a substantially rigid coupling, and practically all of the engine's torque is transferred through the clutch assembly 16 to the plurality of gear sets 18 and on to the output shaft 20. More specifically, during normal operating conditions the solenoid 58 is commanded open and when the pedal 34 is released, the master hydraulic cylinder 38 forces the hydraulic fluid out of the clutch assembly 16. As the hydraulic fluid exits the clutch assembly 16 of the manual transmission 12, the piston (not shown) translates and engages the clutch assembly 16. The hydraulic fluid exits the clutch assembly 16 through the second hydraulic line 35 and moves into the flow control device 26. The hydraulic fluid passes through the second fluid passage 48, through the open solenoid 58, and through the first fluid passage 46 and into the first hydraulic fluid line 33. The valve 56 remains closed and prevents hydraulic fluid from bypassing the solenoid 58.

During release of the pedal 34 as described above, the controller 32 monitors the pedal position via the pedal position sensor 30 and the temperature of the hydraulic fluid via the fluid temperature sensor 28. The controller 32 calculates a rate of pedal movement from the data received from the pedal position sensor 30 and compares the rate of pedal movement to a threshold. A rate of pedal movement that is greater than the threshold is indicative of an undesirable rate of clutch engagement (which can lead to an undesirable peak torque load on the manual transmission 12). This can occur either intentionally or unintentionally during operation of the motor vehicle, such as during launch of the vehicle using a snap clutch maneuver, during a downshift and selection a lower gear than intended, or during an accidental release of the pedal 34. If the rate of pedal movement exceeds the threshold, the controller 32 sends a control signal to the solenoid 58 in order to at least partially close the solenoid 58, thereby restricting the flow of the hydraulic fluid through the flow control device 26. Restriction of the flow of the hydraulic fluid leaving the clutch assembly 16 in turn reduces the speed at which the clutch assembly 16 engages (i.e. controls the clutch engagement rate), which in turn reduces the peak torque loads on the manual transmission 12. The controller 32 adjusts the electrical frequency or signal sent to the solenoid 58 to account for the temperature of the hydraulic fluid sensed by the temperature sensor 28 in order to account for changes in viscosity of the hydraulic fluid due to temperature. Alternatively, the controller 32 may use the temperature of the hydraulic fluid to adjust the threshold. For example, the threshold is adjusted or selected based on the temperature of the hydraulic fluid sensed by the temperature sensor 28 in order to account for the viscosity of the hydraulic fluid based on its temperature. The threshold may be adjusted or selected based on the temperature of the hydraulic fluid using control logic, look-up tables, or software algorithms stored within the memory of the controller 32. Additionally, the controller 32 may regulate the flow of hydraulic fluid through the flow control device 26 based on the temperature of the hydraulic fluid during release and depression of the pedal 34 when the rate of pedal movement does not exceed the threshold.

The description of the invention is merely exemplary in nature and variations that do not depart from the gist of the invention are intended to be within the scope of the invention. Such variations are not to be regarded as a departure from the spirit and scope of the invention.

I claim:

1. A system for controlling a flow of hydraulic fluid between a hydraulic actuator and a torque transmitting device, the system comprising:

a position sensor in communication with the hydraulic actuator and operable to detect a position of the hydraulic actuator;

a temperature sensor in communication with the hydraulic fluid and operable to detect a temperature of the hydraulic fluid;

a flow control device including:

a housing defining a first passage and a second passage, the first passage in communication with the hydraulic actuator and the second passage in communication with the torque transmitting device; and an electronic actuator located between the first passage and the second passage, the electronic actuator operable to selectively control a flow of the hydraulic fluid between the first passage and the second passage; and a controller in communication with the position sensor, the temperature sensor, and the electronic actuator of the flow control device, the controller having memory for storing control logic, the control logic having a first control logic for receiving a data signal from the position sensor indicative of a position of the hydraulic actuator, a second control logic for determining a rate of hydraulic actuator movement, a third control logic for comparing the rate of hydraulic actuator movement to a threshold, a fourth control logic for receiving a data signal from the temperature sensor indicative of a temperature of the hydraulic fluid, and a fifth control logic for sending a control signal to the electronic actuator in order to open or close the electronic actuator based on the temperature of the hydraulic fluid and the comparison of the rate of hydraulic actuator movement to the threshold.

2. The system of claim 1 wherein the electronic actuator is a pulse-width modulated solenoid that is controlled by a pulse-width modulated input signal communicated from the controller.

3. The system of claim 1 wherein the housing of the flow control device defines a third passage that communicates between the first passage and the second passage.

4. The system of claim 3 wherein the flow control device further includes a one-way valve located within the third passage that permits flow of the hydraulic fluid from the third passage to the second passage.

5. The system of claim 1 wherein the rate of hydraulic actuator movement is the rate of hydraulic actuator movement from a fully engaged position to a fully released position.

6. The system of claim 1 wherein the threshold is based on the temperature of the hydraulic fluid sensed by the temperature sensor.

7. The system of claim 1 wherein the fifth control logic for sending a control signal to the electronic actuator in order to open or close the electronic actuator based on the temperature of the hydraulic fluid and the comparison of the rate of hydraulic actuator movement to the threshold occurs when the rate of hydraulic actuator movement exceeds the threshold.

8. A system for controlling a flow of hydraulic fluid between a clutch pedal and a clutch, the system comprising:

a clutch pedal sensor coupled to the clutch pedal and operable to detect a position of the clutch pedal;

a temperature sensor in communication with the hydraulic fluid and operable to detect a temperature of the hydraulic fluid;

a flow control device comprising:

a housing defining a first passage, a second passage, and a third passage, the first passage in communication with the clutch pedal, the second passage in communication with the clutch, and the third passage in communication with the first passage and with the second passage;

an electronic actuator located between the first passage and the second passage, the electronic actuator operable to selectively control a flow of the hydraulic fluid between the first passage and the second passage; and a one-way valve located within the third passage that selectively permits flow of the hydraulic fluid from the third passage to the second passage; and a controller in communication with the clutch pedal sensor, the temperature sensor, and the electronic actuator of the flow control device, the controller having memory for storing control logic, the control logic comprising a first control logic for receiving a data signal from the clutch pedal sensor indicative of a position of the clutch pedal, a second control logic determining a rate of clutch pedal movement from a fully depressed position to a fully released position, a third control logic for comparing the rate of clutch pedal movement to a threshold, a fourth control logic for receiving a data signal from the temperature sensor indicative of a temperature of the hydraulic fluid, and a fifth control logic for sending a control signal to the electronic actuator in order to open or close the electronic actuator based on the temperature of the hydraulic fluid if the rate of clutch pedal movement exceeds the threshold.

9. A method for controlling a flow of hydraulic fluid between a clutch pedal and a clutch, the method comprising:

receiving a data signal from a clutch pedal sensor coupled to the clutch pedal indicative of a position of the clutch pedal;

determining a rate of clutch pedal movement from the position of the clutch pedal;

comparing the rate of clutch pedal movement to a threshold;

receiving a data signal from a temperature sensor indicative of a temperature of the hydraulic fluid; and sending a control signal to an electronic actuator located between the clutch pedal and the clutch in order to open or close the electronic actuator based on the temperature of the hydraulic fluid if the rate of clutch pedal movement exceeds the threshold in order to control the flow of hydraulic fluid from the clutch pedal to the clutch.

* * * * *